United States Patent Office 3,485,837
Patented Dec. 23, 1969

3,485,837
CYCLOPENTAQUINOXALINE COMPOUNDS
Gerhard R. Wendt, Havertown, and Kurt W. Ledig, Philadelphia, Pa., assignors to American Home Products Corporation, New York, N.Y., a corporation of Delaware
No Drawing. Filed Jan. 17, 1967, Ser. No. 609,782
Int. Cl. C07d 51/78; A61k 27/00
U.S. Cl. 260—250                  10 Claims

ABSTRACT OF THE DISCLOSURE

The compounds are of the class of cyclopenta[b]quinoxaline carboxylic acid derivatives, useful as anti-inflammatory and analgesic agents.

---

This invention relates to and has for its objects the provision of new physiologically active compounds and a novel process for their production.

More particularly, this invention relates to a compound selected from the group consisting of those of the formulae:

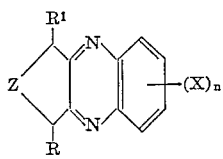

and

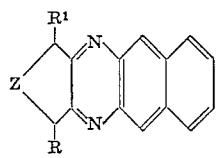

and the pharmaceutically acceptable acid-addition salts thereof, wherein X is hydrogen, halo, lower alkyl, carboxy and lower alkoxy carbonyl; $n$ is an integer from 1 to 4; R and $R^1$ are each hydrogen, lower alkyl and lower alkoxy carbonyl; and Z is

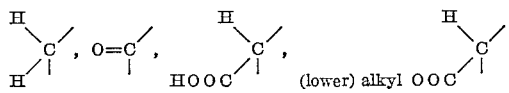

and

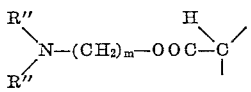

wherein $R''$ is lower alkyl and $m$ is an integer from 1 to 4, with the proviso that X is hydrogen only when Z is

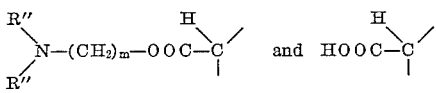

wherein $R''$ and $m$ are as hereinbefore defined, and X is lower alkyl only when $m$ is 2.

The terms "lower alkyl" or "lower alkoxy" are intended to mean radicals having 1 to 6 carbon atoms, either straight chain or branched.

Among the suitable acid-addition salts include, inter alia, inorganic acids, such as the hydrohalic acids (e.g., hydrochloric and hydrobromic acid), sulphuric acid, nitric acid and phosphoric acid, and organic acids such as fumaric, tartaric, citric, acetic, succinic and maleic.

The novel compounds of this invention are pharmacologically active substances which are useful as anti-inflammatory and analgesic agents.

The compounds of the present invention can be prepared and administered to warm-blooded animals in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be encapsulating material. In powders the carrier is a finely divided solid which is in admixture with the finely divided compound. In the tablet the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is sub-divided in unit doses containing appropriate quantities of the compound, the unit dosage form can be a packaged preparation, the package containing discrete quantities of preparation, for example, packaged powders of vials or ampules.

The unit dosage form can be a capsule, cachet or tablet itself or it can be the appropriate number of any of those in packaged form. The quantity of compound in a unit dose of preparation may be varied or adjusted from a 1 mg. to 100 mg. according to the particular application and the potency of the active ingredient.

In therapeutic use, the preparations are administered at the initial dosage of about 5 mg. to 25 mg. per kilogram daily. The dosages, however, may be varied depending upon the requirements of the patient.

In accordance with one feature of this invention, the compounds of this invention may be prepared as illustrated in the following reaction scheme, wherein R, $R^1$, X, Z and $n$ are as hereinbefore defined:

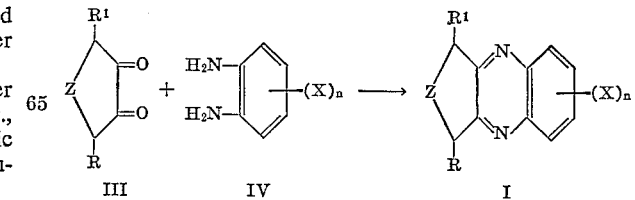

The cyclopentane-dione compounds of Formula III are reacted with known 2-amino-anilines of Formula IV in ture of acetic acid and hydrochloric acid, or a mixture of acetic acid and a salt thereof. When using acetic acid, or any acid, approximating the acid strength of acetic acid, the reaction will proceed under reflux conditions. If one uses a mixture of acetic acid and hydrochloric acid, or acetic acid and sodium acetate, a lower alkanol solvent is used and the mixture is mildly heated either at refluxing or at steam bath temperatures. If the starting compounds are not commercially available, they may be prepared by known procedures.

In accordance with another feature of this invention, the cyclopentane dione compounds of Formula III may be similarly reacted with o-naphthalenediamine to form the final products of Formula II of this invention.

As a further feature of this invention, the final products wherein Z is

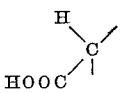

may be reacted with a compound of the Formula V:

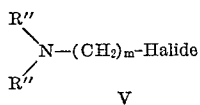

wherein R″ and m are as hereinbefore defined to yield the final compounds wherein Z is

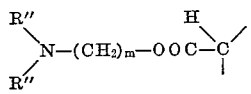

The following examples illustrate the invention (all temperatures being in centigrade):

EXAMPLE 1

2,3-dihydro-1H-cyclopenta[b]-quinoxaline-1,3,6-tricarboxylic acid-1,3-diethyl ester A solution of 10.0 gm. of 4,5-dioxo-1,3-cyclopentanedicarboxylic acid, diethyl ester, 200 ml. of water, and 100 ml. of alcohol is brought to a boil and treated with a solution of 7.0 gm. of 3,4-diaminobenzoic acid, 200 ml. of water and 20 ml. of acetic acid. The resulting precipitate was filtered and recrystallized from acetic acid to give 2,3 - dihydro - 1H - cyclopenta[b] - quinoxaline - 1,3,6-tricarboxylic acid-1,3-diethyl ester.

Analysis.—Calcd. for $C_{18}H_{18}N_2O_6$: C, 60.33; H, 5.06; N, 7.82. Found: C, 60.40; H, 4.61; N, 7.63.

EXAMPLE 2

6-carboxy-1,3-dihydro-1-propyl-2H-cyclopenta[b]-quinoxalin-2-one

A solution of 5.0 gm. of 3-propyl-1,2,4-cyclopentatrione in 300 ml. of water is refluxed with a solution of 4.5 gm. of 3,4-diaminobenzoic acid in 50 ml. of water and 20 ml. of acetic acid for several minutes. After cooling, the precipitate is filtered and recrystallized from aqueous dimethyl formamide to yield 6.0 g. of 6-carboxy-1,3-dihydro-1-propyl-2H-cyclopenta[b]-quinoxalin-2-one M.P. >300°.

Analysis.—Calcd. for $C_{15}H_{14}N_2O_3$: C, 66.65; H, 5.22; N, 10.37. Found: C, 66.33; H, 5.19; N, 10.57.

EXAMPLE 3

6-carboxy-1,3-dihydro-1-ethyl-2H-cyclopenta[b]-quinoxalin-2-one

A solution of 4.5 gm. of 3-ethyl-1,2,4-cyclopentatrione in 200 ml. of water is refluxed with a solution of 4.9 gm. of 3,4-diaminobenzoic acid, 50 ml. of water and 20 ml. of acetic acid for several minutes. After cooling, the precipitate is filtered and recrystallized from aqueous dimethyl formamide to yield 4.5 g. of 6-carboxy-1,3-dihydro-1-ethyl-2H-cyclopenta[b]quinoxalin-2-one, M.P. >300°.

Analysis.—Calcd. for $C_{14}H_{12}N_2O_3$: C, 65.62; H, 4.72; N, 10.93. Found: C, 65.37; H, 4.58; N, 10.89.

EXAMPLE 4

1,3-dihydro-1-propyl-2H-cyclopenta[b]-quinoxalin-2-one-6-carboxylic acid, methyl ester A solution of 3.0 gm. of 3,4-diaminobenzoic acid methyl ester in 100 ml. of water is refluxed with 300 ml. of an aqueous solution of 3.0 gm. of 3-propyl cyclopentane-1,2,4-trione for several minutes. The reaction mixture was cooled and the precipitate filtered off and recrystallized from alcohol to yield 1,3-dihydro-1-propyl-2H-cyclopenta[b]-quinoxalin-2-one-6-carboxylic acid, methyl ester, M.P. 298–300° (dec.).

Analysis.—Calcd. for $C_{16}H_{16}O_3N_2$: C, 67.59; H, 5.07; N, 9.85. Found: C, 67.29; H, 5.40; N, 9.69.

EXAMPLE 5

1,3-dihydro-2-oxo-2H-cyclopenta[b]-quinoxaline-1,6-dicarboxylic acid, 1-ethyl ester, 6-methyl ester An aqueous solution (250 ml.) of 1.95 gm. of 3,4-diaminobenzoic acid, methyl ester is refluxed with an aqueous solution (200 ml.) of 3.0 gm. of 3,5-dicarbethoxy-1,2,4-cyclopentantrione for 10 minutes. The resulting precipitate is filtered and recrystallized from N,N-dimethyl formamide, giving 1.1 gm. of 1,3-dihydro-2-oxo-2H-cyclopenta[b] - quinoxaline - 1,6 - dicarboxylic acid, 1-ethyl ester, 6-methyl ester, M.P. 248–252°.

Analysis.—Calcd. for $C_{16}H_{14}N_2O_5$: C, 61.14; H, 4.49; N, 8.91. Found: C, 61.06; H, 4.11; N, 8.70.

EXAMPLE 6

2,3-dihydro-6,7-dimethyl-1H-cyclopenta[b]-quinoxaline

To a solution of 2.7 gm. of cyclopentane-1,2-dione in 5 ml. of water is added a solution of 4.5 gm. of 4,5-dimethyl-o-phenylenediamine, 25 ml. of alcohol, 5 ml. of water and 4 ml. of acetic acid. The reaction mixture is boiled for several minutes and the precipitate is filtered. Recrystallization from aqueous alcohol yields 4.0 gm. of 2,3-dihydro - 6,7 - dimethyl - 1H - cyclopenta[b] - quinoxaline, M.P. 170–171°.

Analysis.—Calcd. for $C_{13}H_{14}N_2$: C, 78.75; H, 7.12; N, 14.13. Found: C, 78.98; H, 7.07; N, 13.86.

EXAMPLE 7

2,3-dihydro-6,7-dimethyl-1H-cyclopenta[b]quinoxaline-2-carboxylic acid

A solution of 2.3 gm. of 3,4-dioxo-1-cyclopentane-carboxylic acid in 10 ml. of water is added to a solution of 2.3 gm. of 4,5-dimethyl-o-phenylenediamine, 20 ml. of water and 2 ml. of acetic acid. The reaction mixture is refluxed for several minutes, cooled and the resulting precipitate is filtered and recrystallized from a mixture of methanol/ethanol to yield 2,3-dihydro-6,7-dimethyl-1H-cyclopenta[b]quinoxaline-2-carboxylic acid, M.P. 251–253°.

Analysis.—Calcd. for $C_{14}H_{14}N_2O_2$: C, 69.40; H, 5.83; N, 11.56. Found: C, 69.08; H, 5.80; N, 11.25.

EXAMPLE 8

2,3 - dihydro - 6,7 - dimethyl - 1H - cyclopenta[b]quinoxaline-1,2,3-tricarboxylic acid, 1,2-dimethyl ester, 3-ethyl ester A solution of 2.2 gm. of 1,2,3-tricarboxy-4,5-cyclopentanedione, ethyl ester dimethyl ester in 20 ml. of alcohol is added to a solution of 800 mg. of 4,5-dimethyl-o-phenylenediamine, 20 ml. of water and 2 ml. of acetic acid. The reaction mixture is brought to a boil and after cooling the resulting gum is treated with methanol to obtain 2,3 - dihydro - 6,7 - dimethyl - 1H - cyclopenta[b]quinoxaline-1,2,3-tricarboxylic acid, 1,2-dimethyl ester, 3-ethyl ester, M.P. 167–168°.

Analysis.—Calcd. for $C_{20}H_{22}N_2O_6$: C, 61.28; H, 5.41; N, 7.52. Found: C, 61.84; H, 5.97; N, 7.34.

EXAMPLE 9

2,3-dihydro-1H-cyclopenta[b]quinoxaline-2-carboxylic acid

A solution of 23.0 gm. (0.16 mole) of 3,4-dioxo-1-cyclopentane carboxylic acid in 100 ml. of water is refluxed with 23.0 gm. (0.21 mole) of o-phenylenediamine in 200 ml. of water and 20 ml. of acetic acid for a few minutes. The resulting precipitate is filtered and recrystallized from acetic acid, yielding 11.7 g. (34.0%) of 2,3-dihydro-1H-cyclopenta[b]quinoxaline-2 - carboxylic acid, M.P. 234–236°, $$\lambda_{max.}^{KBr} \ 5.90\mu$$

*Analysis.*—Calcd. for $C_{12}H_{10}N_2O_2$: C, 67.28; H, 4.71; N, 13.08. Found: C, 67.46; H, 5.03; N, 13.18.

EXAMPLE 10

1,3-dihydro-6,7-dimethyl-2-oxo-2H-cyclopenta[b]quinoxaline-1,3-dicarboxylic acid, diethyl ester A solution of 13.5 gm. (95 mmoles) of 3,5-dicarbethoxy-1,2,4-cyclopentanetrione, dipotassium enolate in 130 ml. of water is heated with a solution of 14 gm. (130 mmoles) of 4,5-dimethyl-o-phenylenediamine in 100 ml. of water and 20 ml. of acetic acid at 80° C. for several minutes. The resulting brown precipitate is filtered and recrystallized from methanol-ethanol, yielding 16.3 g. (58%) of 1,3-dihydro-6,7-dimethyl-2-oxo-2H-cyclopenta[b]quinoxaline-1,3-dicarboxylic acid, diethyl ester, M.P. 189–194°.

*Analysis.*—Calcd. for $C_{19}H_{20}N_2O_5$: C, 64.03; H, 5.66; N, 7.86. Found: C, 64.06; H, 5.42; N, 8.11.

EXAMPLE 11

6,7-dichloro-2,3-dihydro-1H-cyclopenta[b]quinoxaline-1,3-dicarboxylic acid, diethyl ester An alcoholic solution (50 ml.) of 10.0 gm. of 4,5-dioxo-1,3-cyclopentane dicarboxylic acid, diethyl ester is refluxed with 10.0 gm. of 4,5-dichloro-o-phenylenediamine in 100 ml. of ethanol and 25 ml. of water for several minutes. The resulting precipitate is filtered and recrystallized from ethanol, yielding 11.8 g. of 6,7-dichloro-2,3-dihydro - 1H - cyclopenta[b]quinoxaline - 1,3 - dicarboxylic acid, diethyl ester, M.P. 212–215°

*Analysis.*—Calcd. for $C_{17}H_{16}Cl_2N_2O_4$: C, 53.27; H, 4.21; Cl, 18.50; N, 6.71. Found: C, 53.21; H, 4.06; Cl, 18.30; N, 6.71.

EXAMPLE 12

2,3-dihydro-1H-cyclopenta[b]quinoxaline-2-carboxylic acid, [2(diethylamino)ethyl] ester, hydrochloride A hot solution of 2.1 gm. (10.0 mmoles) of 2,3-dihydro - 1H - cyclopenta[b]quinoxaline - 2 - carboxylic acid in 43.0 ml. of isopropanol is treated with 1.4 g. (10.0 mmoles) of β-diethylaminoethyl chloride in 32 ml. of isopropanol and the reaction mixture is heated to reflux for 5 hours, cooled and filtered. Addition of ether to the filtrate precipitated the product. Recrystallization from acetone yields 1.0 gm. (28.5%) of 2,3-dihydro-1H-cyclopenta[b]quinoxaline-2-carboxylic acid, [2(diethylamino)ethyl] ester, hydrochloride, M.P. 165–167° C., $$\lambda_{max.}^{KBr} \ 4.15\mu \text{ and } 5.75\mu$$

*Analysis.*—Calcd. for $C_{18}H_{23}N_3O_2 \cdot HCl$: C, 61.79; H, 6.92; N, 12.01; Cl, 10.4. Found: C, 61.60; H, 7.20; N, 11.83; Cl, 10.30.

EXAMPLE 13

2,3-dihydro-6,7-dichloro-1H-cyclopenta[b]quinoxaline

An aqueous solution (10 ml.) of 5.4 gm. of cyclopentane-1,2-dione is refluxed with 10.8 gm. of 4,5-dichloro-o-phenylenediamine in 50 ml. of alcohol, 10 ml. of water and 8 ml. of acetic acid for several minutes. The resulting precipitate is filtered and recrystallized from N,N-dimethylformamide, yielding 10.0 g. of 2,3-dihydro-6,7-dichloro-1H-cyclopenta[b]quinoxaline, M.P. 221–225°.

*Analysis.*—Calcd. for $C_{11}H_8N_2Cl_2$: C, 55.26; H, 3.37; N, 11.71; Cl, 29.66. Found: C, 55.02; H, 3.62; N, 11.90; Cl, 29.60.

EXAMPLE 14

2,3-dihydro-6,7-difluoro-1H-cyclopenta[b]quinoxaline

Following the procedure of Example 13, but substituting 4,5-difluoro-o-phenylenediamine for 4,5-dichloro-o-phenylenediamine there is obtained 2,3-dihydro-6,7-difluoro-1H-cyclopenta[b]quinoxaline.

EXAMPLE 15

2,3-dihydro-1H-cyclopenta[b]quinoxaline-1,3,6-tricarboxylic acid-1,3-dipropyl ester A solution of 10.0 g. of 4,5-dioxo-1,3-cyclopentanedicarboxylic acid, dipropyl ester, 200 ml. of water and 100 ml. of alcohol is brought to a boil and treated with a solution of 7.0 gm. of 3,4-diaminobenzoic acid, 200 ml. of water and 20 ml. of acetic acid. The resulting precipitate is filtered and recrystallized from acetic acid to give 2,3-dihydro - 1H - cyclopenta[b]quinoxaline - 1,3,6 - tricarboxylic acid-1,3-dipropyl ester.

EXAMPLE 16

2,3-dihydro-2-oxo-1H-benzo[g]cyclopenta[b]quinoxaline-1-carboxylic acid, ethyl ester A solution of 5.1 gm. (20 mmoles) of 3,5-dicarbethoxy-1,2,4-cyclopentanetrione in 50 ml. of water is heated with a solution of 4.8 gm. (30 mmoles) of 2,3-diamino-naphthalene in 1.5 ml. of ethanol and 10 ml. of acetic acid for several minutes. The resulting precipitate is filtered and recrystallized from N,N - dimethylformamide - ethanol (2:1) yielding 5.3 g. (70%) of 2,3-dihydro-2-oxo-1H-benzo[g]cyclopenta[b]quinoxaline-1-carboxylic acid, ethyl ester, M.P. 244–249° (dec.).

*Analysis.*—Calcd. for $C_{18}H_{14}N_2O_3$: C, 70.58; H, 4.61; N, 9.15. Found: C, 70.76; H, 4.31; N, 9.23.

EXAMPLE 17

2,3-dihydro-6,7-dimethyl-1H-cyclopental[b]quinoxaline-1,2,3-tricarboxylic acid, triethyl ester A hot solution of 15.7 gm. (50 mmoles) of 3,4,5-tricarbethoxy-1,2-cyclopentaedione in 125 ml. of aqueous ethanol (67% dilution) is refluxed with 6.8 gm. (50 mmoles) of 4,5-dimethyl-o-phenylenediamine in 250 ml. of water and 15 ml. of acetic acid for several minutes. The solution is decanted and the residual oil is triturated with methanol, and recrystallized with methanol-hexane (1:8) yielding 14.3 g. (68.5%) of 2,3-dihydro-6,7-dimethyl-1H-cyclopenta[b]quinoxaline-1,2,3 - tricarboxylic acid, triethyl ester, M.P. 155–158°.

*Analysis.*—Calcd. for $C_{22}H_{26}N_2O_6$: C, 63.75; H, 6.32; N, 6.76. Found: C, 63.46; H, 6.70; N, 6.89.

EXAMPLE 18

2,3-dihydro-1H-benzo[g]cyclopenta[b]quinoxaline-1-carboxylic acid, ethyl ester

A hot aqueous solution (20 ml.) of 1.5 gm. (88 mmoles) 2,3-dioxo-1-cyclopentane carboxylic acid, ethyl ester is refluxed with 1.5 gm. (97 mmoles) of 2,3-diamino-naphthalene in 20 ml. of alcohol and 3.0 ml. of acetic acid for several minutes. The resulting yellow precipitate is filtered and recrystallized from alcohol, yielding 1.5 g. (58%) of 2,3-dihydro-1H - benzo[g]cyclopenta[b]quinoxaline - 1-carboxylic acid, ethyl ester, M.P. 190–192°

$$\lambda_{max.}^{KBr} \ 5.99\mu \text{ and } 6.14\mu.$$

*Analysis.*—Calcd. for $C_{18}H_{16}N_2O_2$: C, 73.95; H, 5.52; N, 9.58. Found: C, 73.66; H, 5.23; N, 9.25.

What is claimed is:

1. 2,3-dihydro-1H-cyclopenta[b]quinoxaline-1,3,6 - tricarboxylic acid-1,3-diethyl ester.

2. 6-carboxy-1,3-dihydro-1-propyl-2H - cyclopenta[b]quinoxalin-2-one.

3. 6-carboxy-1,3-dihydro-1-ethyl - 2H - cycopenta[b]quinoxalin-2-one.

4. 1,3-dihydro-1-propyl-2H-cyclopenta[b]quinoxalin-2-one-6-carboxylic acid, methyl ester.

5. 1,3-dihydro-2-oxo-2H-cyclopenta[b]quinoxaline-1,6-dicarboxylic acid, 1-ethyl ester, 6-methyl ester.

6. 6,7-dichloro-2,3-dihydro - 1H - cyclopenta[b]quinoxaline-1,3-dicarboxylic acid, diethyl ester.

7. 2,3-dihydro-1H-cyclopenta[b]quinoxaline-2-carboxylic acid, [2-(diethylamino)ethyl] ester, hydrochloride.

8. 2,3-dihydro-1H-cyclopenta[b]quinoxaline-1,3,6 - tricarboxylic acid-1,3-dipropyl ester.

9. 2,3-dihydro-2-oxo - 1H - benzo[g]cyclopenta[b]quinoxaline-1-carboxylic acid, ethyl ester.

10. 2,3-dihydro-1H-benzo[g]cyclopenta[b]quinoxaline-1-carboxylic acid, ethyl ester.

References Cited

UNITED STATES PATENTS 3,361,747  1/1968  Wendt et al. _____ 260—250

OTHER REFERENCES

Wanzlick et al.: C. A. 53, 8012d, Chem. Ber. 91, 2727–33 (1958).

Haworth et al.: C. A. 49, 11632a, J. Chem. Soc., 1954, 3611–17.

Ruggli et al.: C. A. 40, 4682 [2], Helv. Chim. Acta., 29, 600–9 (1946).

Gibson et al.: C. A. 22, 947 [6], J. Chem. Soc., 1927, 3009–15.

Chuang et al.: C. A. 29, 5084 [2], Ber. 68B (882–6), 1935.

Kon: C. A. 16, 1943 [3], J. Chem. Soc., 121, 513–32 (1922).

ALEX MAZEL, Primary Examiner

R. V. RUSH, Assistant Examiner

U.S. Cl. X.R.

424—250

UNITED STATES PATENT OFFICE
CERTIFICATE OF CORRECTION

Patent No. 3,485,837                          December 23, 1969

Gerhard R. Wendt et al.

It is certified that error appears in the above identified patent and that said Letters Patent are hereby corrected as shown below:

Column 2, after line 71, insert -- the presence of an acid catalyst such as acetic acid, a mix- --.

Signed and sealed this 10th day of November 1970.

(SEAL)
Attest:

Edward M. Fletcher, Jr.                        WILLIAM E. SCHUYLER, JR.
Attesting Officer                                   Commissioner of Patents